(No Model.) 2 Sheets—Sheet 2.
F. G. KRETSCHMER.
METAL SCREW MACHINE.
No. 568,484. Patented Sept. 29, 1896.
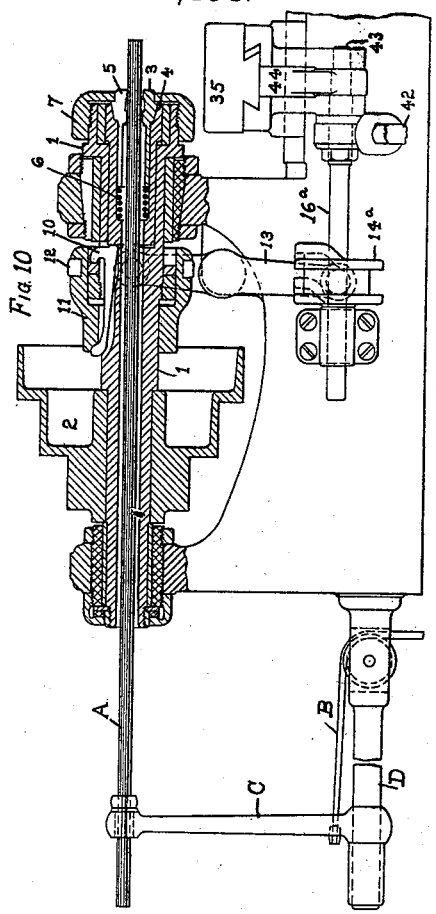
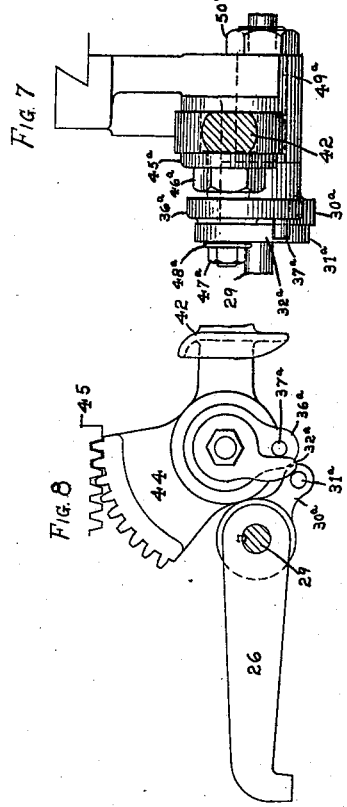
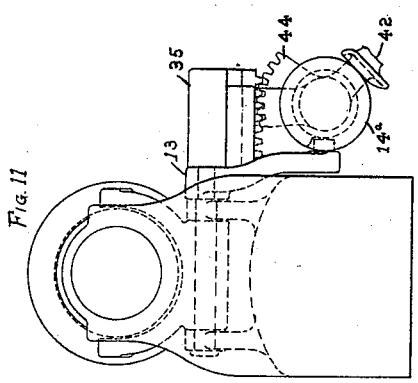
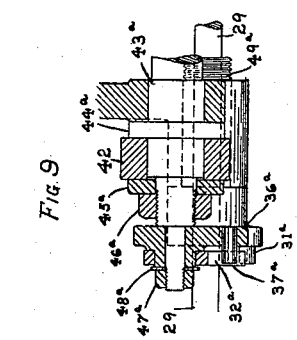
Witnesses.
Ira L. Fish
H. R. Abbott
Inventor
Frederick G. Kretschmer,
By Wilmarth H. Thurston,
Attorney.

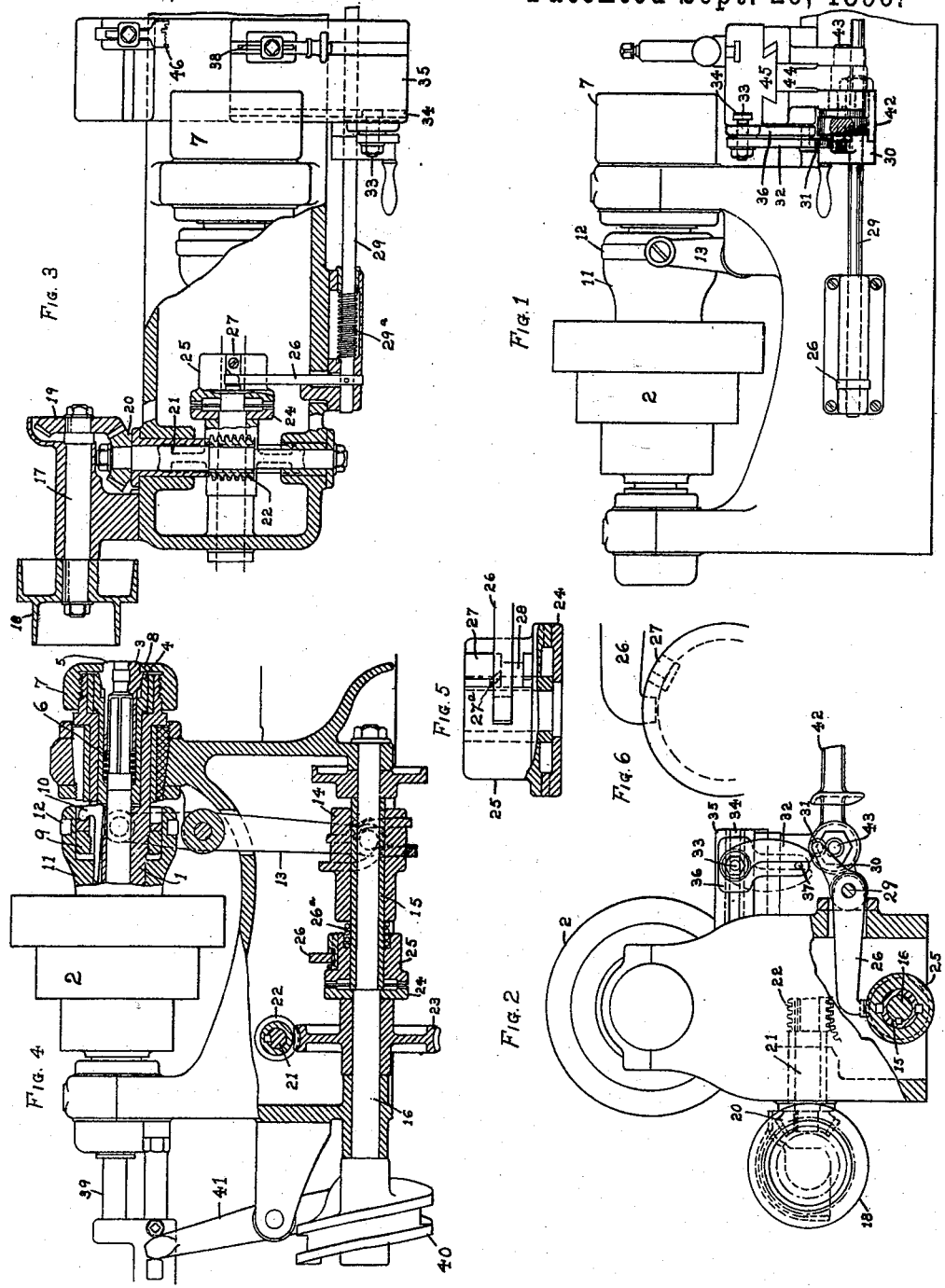

UNITED STATES PATENT OFFICE.

FREDERICK GOTTHOLD KRETSCHMER, OF NEW YORK, N. Y., ASSIGNOR TO THE BROWN & SHARPE MANUFACTURING COMPANY, OF PROVIDENCE, RHODE ISLAND.

METAL-SCREW MACHINE.

SPECIFICATION forming part of Letters Patent No. 568,484, dated September 29, 1896.

Application filed March 3, 1896. Serial No. 581,685. (No model.)

*To all whom it may concern:*

Be it known that I, FREDERICK GOTTHOLD KRETSCHMER, of the city and county of New York, State of New York, have invented certain new and useful Improvements in Metal-Screw Machines; and I do hereby declare the following specification, taken in connection with the accompanying drawings, forming part of the same, to be a full, clear, and exact description thereof.

The present invention relates to that class of metal-screw machines in which a rod of stock is intermittently fed forward for the prescribed distance required to make a screw of given length and is held in the jaws of a revolving chuck, with a sufficient length of the same projecting beyond the face of such chuck to be operated upon by a series of tools mounted in a turret-head.

While not limited thereto, the present invention is especially adapted for use in that class of screw-machines in which the tool-carrier, which carries the cutting-off or other tool, is reciprocated by hand, and in the accompanying drawings two forms of such machines embodying the present improvements have been illustrated.

The invention consists of the features and combinations hereinafter described and claimed.

Referring to the drawings, Figure 1 is a side elevation of so much of a screw-machine as is necessary to show my present improvements. Fig. 2 is an end elevation. Fig. 3 is a plan view, partly in section. Fig. 4 is a longitudinal section, partly in elevation. Figs. 5 and 6 are details of the clutch and holding device. Figs. 7, 8, and 9 are details of a modification. Fig. 10 is a side elevation, partly in section; and Fig. 11 is an end elevation of another modification.

Referring to Figs. 1 to 6, the chuck-carrying hollow spindle 1, having the cone-pulley 2 secured thereto, is mounted in the frame in the usual or in any manner. Any desired form of chuck and chuck-operating mechanism may be connected with the hollow spindle 1. It is preferred, however, to employ the arrangement of chuck and means for operating the jaws thereof shown and described in Patent No. 543,606, granted July 30, 1895, which construction is shown in the accompanying drawings and is as follows: The end of the hollow spindle is enlarged in diameter and chambered out to receive the chuck 3 and its inclosing sleeve 4. The chuck 3 is provided with gripping-jaws 5, which are preferably spring-jaws, said jaws being provided with beveled or inclined outer faces to coöperate with the inclined or conical inner face of the sleeve 4. The chuck 3 is inserted in the sleeve 4, the inner end of said chuck abutting against a spiral spring 6, which is inserted in the bore of said sleeve and which in turn abuts against an internal annular shoulder on said sleeve. The combined chuck and sleeve are mounted in the chambered end of the hollow spindle 1 and are held in place therein by the cap 7, which is screwed onto the end of said spindle and which bears against an annular flange 8, formed on the chuck 3. Said chuck is thus positively held against movement in one direction and is held against movement in the opposite direction by means of spring 6. The jaws 5 are actuated to grip and release the rod of stock by moving the sleeve 4 longitudinally with relation to the chuck 3. The mechanism for moving said sleeve is as follows: An adjustable collar 9 is screwed upon spindle 1 to form a fulcrum or bearing for the short arms of two or more bent levers 10, which levers are loosely arranged in suitable grooves or slots formed in said spindle, with the angle of each of said levers bearing against the end of the chuck-sleeve 4. A hardened-steel collar is inserted between said adjustable collar 9 and the ends, said levers to take up the wear. Surrounding the collars 9 and the levers 10 is the sliding sleeve 11, which likewise revolves with the spindle, said sleeve being slotted to receive the ends of said levers 10, the end of each of said slots being beveled to engage and act upon the corresponding incline or cam-face upon the end of each of said levers. (See Fig. 10.) Said sleeve 11 is provided with an exterior annular groove to receive the ring 12, with which said ring a lever 13 is connected. When the lever 13 is moved in one direction, the sliding sleeve 11 will be moved to force inward the ends of the long arms of the levers 10, thereby causing said levers to turn on their fulcrum and force the chuck-sleeve 4 to the right in Fig. 4, thus causing the jaws to grip the stock. When the sliding sleeve 10 is moved back, so as to release the long arms of levers 10, the spring 6 will return said levers and chuck-sleeve 4 to their normal position, thereby releasing the jaws 5.

The lever 13 may be moved to control the action of the gripping-jaws by any suitable mechanism, and in the construction shown is moved by the cam 14. Cam 14 is keyed to a sleeve 15, secured to a shaft 16, journaled in the frame, said shaft being intermittently operated by the following means:

Mounted in suitable bearings at the back of the machine is a shaft 17, carrying the driving-cone 18 and the bevel-gear 19. The beveled gear 19 meshes with the beveled gear 20, secured to a cross-shaft 21, which shaft carries a worm 22, meshing with and driving a worm-gear 23, loosely mounted on the shaft 16. Secured to the hub of the worm-gear 23 is a clutch member 24, adapted to be engaged by a clutch member 25, sliding on the sleeve 15, but keyed thereto and pressed toward said clutch member 24 by the spiral spring 26ª, interposed between said member 25 and the hub of cam 14, said clutch members forming a driver for said shaft. The clutch member 25 is held out of engagement with the member 24 by a holding device, which, in the form shown, consists of a dog or catch 26, which engages a lug or shoulder 27 on the hub of said clutch member 25, the end of said dog also engaging a recess 28 in said hub to prevent rotation of the shaft 16. The dog 26 is secured to a rock-shaft 29, mounted at the front of the machine, and also carrying an arm 30, provided with a bowl 31 at its free end. The bowl 31 is arranged in the path of a toe or cam 32, pivoted on a stud 33, adjustably secured in a slot 34, formed in the tool-carrier 35. A plate 36 is secured to said tool-carrier 35 by the stud 33 and carries a pin or stop 37, engaging the pivoted toe 32. A torsional spring 29ª has one end secured to the shaft 29 and the other end secured to the bearing for said shaft and tends to hold the dog 26 down against the hub of the clutch member 25.

When the tool-carrier 35 is moved inward to bring the cutting-off tool 38 into operation, the toe 32 yields and rides over the bowl 31, said toe rocking on its pivot and not depressing the arm 30; but when the carrier 35 is moved back the stop 37, by its engagement with toe 32, holds said toe down against the bowl 31, so that the arm 30 is depressed. The depressing of the arm 30 rocks shaft 29 to lift dog 26 out of engagement with the lug 27, thus allowing the spring 26ª to force the clutch member 25 into engagement with the clutch member 24. The shaft 16 is then revolved for one revolution, when the incline or cam 27ª engages the end of dog 26, forcing the clutch member 25 back into its normal position, the end of dog 26 dropping into recess 28 and locking the shaft 16 in position. The revolution of the shaft 16 causes the cam 14 to operate lever 13 to first release the jaws 5 and then return them to grip the stock. During the time the jaws 5 are open the stock is fed forward by any desired means, that shown in Fig. 4 consisting of the reciprocating feeding-tube 39, provided with the usual spring-fingers. This feeding-tube is reciprocated at the proper time by means of a cam 40, secured to shaft 16 and acting on said tube through the lever 41 and suitable connecting device. If desired, the connecting devices shown and described in Patent No. 424,527 may be employed, thereby providing means for adjusting and regulating the feed without stopping the machine.

The tool-carrier 35 may be reciprocated by any suitable means, and in the machine shown is reciprocated by means of the hand-lever 42, secured to a stud 43, to the other end of which is secured a gear-segment 44, engaging a rack 45, secured to the under side of the tool-carrier 35.

With the construction above described it will be seen that the operation of the jaws 5 is so controlled from the means for reciprocating the tool-carrier 35 that when the tool-carrier is drawn back after the cutting-off tool has performed its work the jaws are automatically released to allow the feeding of the stock, and that when the carrier is moved inward to bring the cutting-off tool into operation the jaws are not affected. If it is desired to use a back tool, such as shown at 46, Fig. 3, and to release the jaws 5 on the moving out of said back tool, then the tool 32 may be shifted into the position shown in dotted lines in Fig. 2, so that the arm 30 will be depressed and the jaws 5 released on the inward movement of the tool-carrier, which inward movement serves to move the back tool out of operation.

In Figs. 7, 8, and 9 is illustrated a modified form of means for operating the dog 26. In this modification the stud 43ª, which carries the gear-segment 44, has also secured to it the lever 42, said lever being clamped between the flange 44ª and a washer 45ª by means of the nut 46ª. The end of the stud is turned down and has clamped thereto, by means of the nut 47ª, a plate 36ª, carrying a pin 37ª. The plate 36ª has a projecting hub, on which is loosely pivoted a toe 32ª, said toe being held on said hub by means of a washer 48ª, interposed between the nut 47ª and said hub. An arm 30ª is secured to the shaft 29 and is provided with an extending hub or sleeve 49ª, which is loosely mounted in the frame and held in place by the nut 50ª. The arm 30ª carries a pin 31ª, which projects into the path of the toe 32ª. The operation is substantially the same as that above described. When the lever 42 is operated to move the tool-carrier inward, the toe 32ª is rocked by the engagement with pin 31ª and rides over said pin-arm 30ª; but when the carrier is moved outward the toe is rocked by the pin 37ª and depresses arm 30ª, thus lifting dog 26.

In Figs. 10 and 11 is illustrated a modified form of the present improvements applied to that class of screw-machines in which the feed of the stock is effected by the action of a weight or spring which tends to feed the stock forward when the gripping-jaws are operated to release the stock.

In the above figures, A represents the rod of stock constantly pressed forward in the usual manner by means of a weight (not shown) attached to the end of a strap B, secured to the arm C, said arm sliding on the support D and having its upper end secured to the stock A. In this case the operation of the jaws 5 is controlled from the means for reciprocating the slide through the action of a cam 14ª, secured to the shaft 16ª, which is operated from the stud 43 and is shown as forming an extension of said stud 43. The cam 14ª acts on the lever 13 as the tool-carrier reaches the limit of its outer movement to release the jaws 5 and allow the stock to be fed forward. As soon as the feed has taken place the tool-carrier is moved in far enough to cause the cam 14ª to move the lever 13, and thus operate the jaws 5 to grip the stock, and the carrier remains in this position until it is desired to cut off the finished product preparatory to feeding forward another length of stock.

What I claim as my invention, and desire to secure by Letters Patent, is—

1. In a screw-machine the combination, with means for feeding the stock, a tool-carrier and reciprocating means for operating said carrier, of means for controlling the operation of said feeding means from said reciprocating means, substantially as described.

2. In a screw-machine the combination, with a spindle carrying gripping-jaws, a tool-carrier and reciprocating means for operating said carrier, of means for controlling the operation of said gripping-jaws from said reciprocating means, substantially as described.

3. In a screw-machine the combination, with a spindle carrying gripping-jaws, means comprising a cam for operating said jaws, a tool-carrier and reciprocating means for operating said carrier, of means for controlling the action of said cam from said reciprocating means, substantially as described.

4. In a screw-machine the combination, with a spindle carrying gripping-jaws, means for feeding the stock, a tool-carrier and reciprocating means for operating said carrier, of means for controlling the operation of said gripping-jaws from said reciprocating means, substantially as described.

5. In a screw-machine the combination, with a spindle carrying gripping-jaws, means comprising a cam for operating said jaws, means for feeding the stock, a tool-carrier and reciprocating means for operating said carrier, of means for controlling the action of said cam from said reciprocating means, substantially as described.

6. In a screw-machine the combination, with a spindle carrying gripping-jaws, means for operating said jaws, a driver for said means, a tool-carrier and means for reciprocating said carrier, of means for controlling the operation of said driver from said reciprocating means, substantially as described.

7. In a screw-machine the combination, with a spindle carrying gripping-jaws, means for operating said jaws comprising a cam-shaft, a driver for said shaft, a tool-carrier and means for reciprocating said carrier, of means for controlling the operation of said driver from said reciprocating means, substantially as described.

8. In a screw-machine the combination, with a spindle carrying gripping-jaws, means for feeding the stock, a cam-shaft carrying cams for operating said jaws and feeding means, a driver for said shaft, a tool-carrier and means for reciprocating said tool-carrier, of means for controlling the operation of said driver from said reciprocating means, substantially as described.

9. In a screw-machine the combination, with a spindle carrying gripping-jaws, a tool-carrier, of devices intermediate the said jaws and tool-carrier whereby the said jaws are controlled by the movement of said carrier, substantially as described.

10. In a screw-machine the combination, with the cam-shaft, a driver for said shaft, a holding device for holding said driver out of operation, a tool-carrier, and means for reciprocating said tool-carrier, of means intermediate said holding device and said reciprocating means for operating said holding device, substantially as described.

11. In a screw-machine the combination, with the cam-shaft and a driver for said shaft of a dog for holding said driver out of operation, a device for operating said dog, a toe arranged to yield in one direction for engaging said device and moving the same, and means for reciprocating said toe, substantially as described.

12. In a screw-machine the combination, with the cam-shaft, a driver for said shaft, a holding device for holding said driver out of operation, and a tool-carrier, means intermediate said tool-carrier and said holding device for operating said holding device, substantially as described.

13. In a screw-machine the combination, with the cam-shaft, a driver for said shaft, and a holding device for holding said driver out of operation, of means for operating said holding device comprising a toe arranged to yield in one direction, and means for reciprocating said toe, substantially as described.

FREDERICK GOTTHOLD KRETSCHMER.

Witnesses:
THOMAS TOWNE,
O. C. MIRTEMES.